Power & Bailey,
Cork Machine.
No. 2,030. Reissued July 18, 1865.
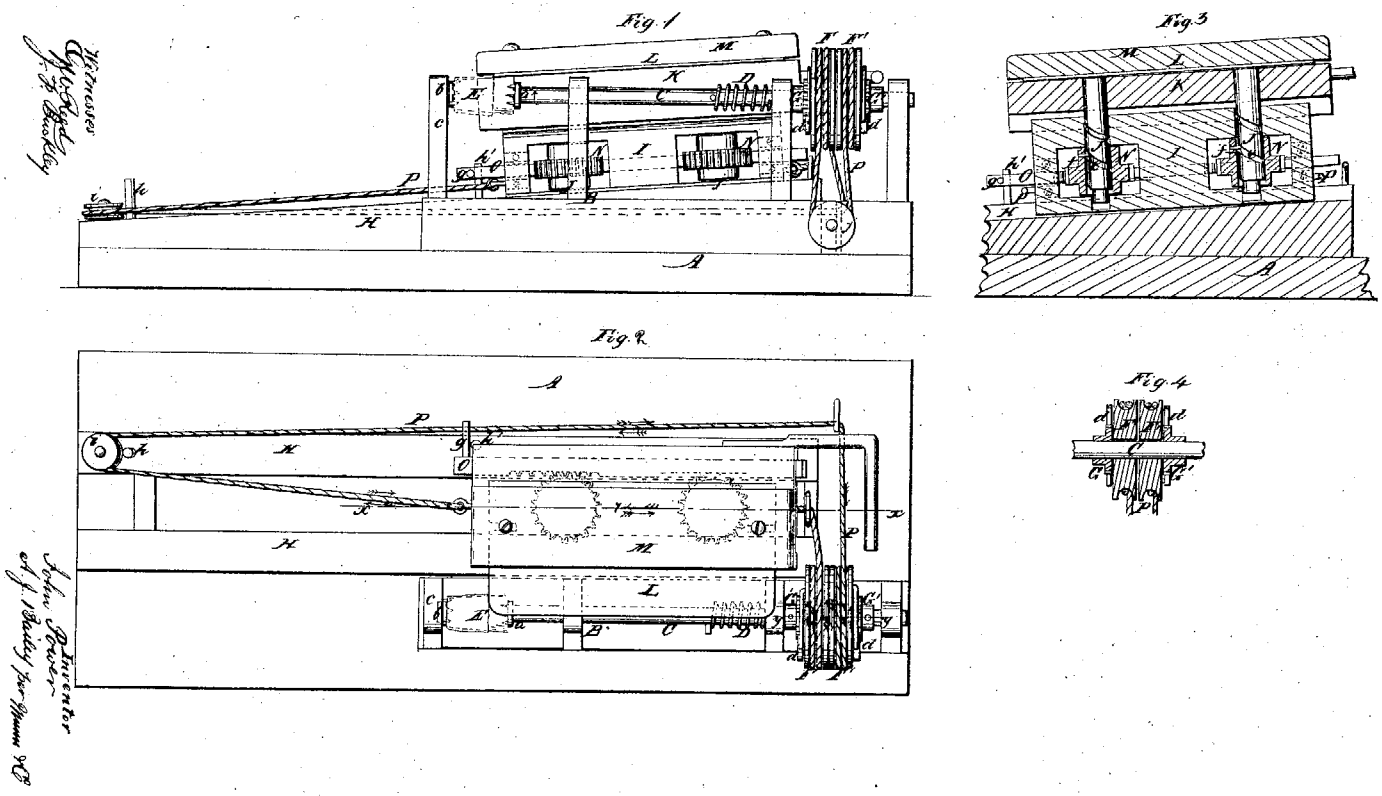
AM. PHOTO-LITHO. CO. N.Y. (OSBORNE'S PROCESS.)

UNITED STATES PATENT OFFICE.

PETER HOLMES, OF CHARLESTOWN, MASSACHUSETTS, ASSIGNEE OF J. POWER AND A. J. BAILEY.

IMPROVEMENT IN MACHINES FOR CUTTING CORKS.

Specification forming part of Letters Patent No. 35,351, dated May 20, 1862; Reissue No. 2,030, dated July 18, 1865.

*To all whom it may concern:*

Be it known that JOHN POWER, of Boston, Suffolk county, Massachusetts, and ANDREW J. BAILEY, of Charlestown, Middlesex county, Massachusetts, have invented a new and Improved Machine for Cutting Cork Stoppers; and I, PETER HOLMES, do hereby declare that the following is a full, clear, and exact description thereof, which will enable those skilled in the art to make and use the same, reference being had to the accompanying drawings, forming part of this specification, in which—

Figure 1 is a side view of this invention. Fig. 2 is a plan or top view of the same. Fig. 3 is a longitudinal vertical section of the same, taken in the plane indicated by the line *x x*, Fig. 2. Fig. 4 is a partial section of the same, the line *y y*, Fig. 2, indicating the plane of section.

Similar letters of reference indicate like parts.

This invention relates to a machine by which cylindrical and conical stoppers for bottles and other vessels can be produced in two cuts with one and the same knife. To effect this purpose a reciprocating knife is used, in connection with a rotary mandrel arranged in such a manner that by the reciprocating movement of the knife a continuous rotary motion in one and the same direction is imparted to said mandrel and the knife during its movement be adjusted automatically, so as to rough off the cork while moving in one and give the finishing cut while moving in the opposite direction.

A represents a bed or platform, on which a head, B, is placed, containing a mandrel, C. This mandrel is allowed to work longitudinally in its head B, and it has a spiral spring, D, upon it, which has a tendency to keep the cork E to be cut between a spur-head, *a*, at the inner end of the mandrel, and another spur-head, *b*, which is allowed to rotate freely in an upright, *c*, rising from the head B, the spur-head *a* connecting the cork E with the mandrel C and causing it to rotate with it. On the mandrel C there are placed two loose pulleys, F F′, side by side, which are provided each with a pawl, *d*, to catch into a ratchet, G or G′, that are permanently secured on the mandrel. (See Figs. 1, 2, and 4).

H H are two parallel inclined ways, which are placed on the bed or platform A parallel with the mandrel C. Between these ways H H there is placed a slide, I, in which there are two shafts, J J, parallel with each other and at right angles with the upper surfaces of the ways H H, as shown clearly in Fig. 3. The shafts J J project up through the slide I and fit in a cap, K, which is placed on the top of the slide I, and to which a knife, L, is secured by a clamp, M. The knife L projects out from the slide I, so that its cutting-edge will be directly over the center of the mandrel C. The cap K, and consequently the knife L, has an inclined position corresponding with that of the ways H H. Each shaft J has a spiral groove, *e*, made in it, and on each shaft a loose pinion, N, is placed. These pinions are connected with the shafts J J by pins *f*, which project from the inner surfaces of the hubs of the pinions, and fit in spiral grooves *e e* of the shafts J J, as shown in Fig. 3. The pinions N N both gear into a sliding rack, O, which is fitted in guides attached to the slide I, said rack having a pin, *g*, projecting at right angles from its lower end, as shown in Fig. 2. To one of the ways H there are attached two upright pins, *h h′*, one, *h*, being at the lower end of the way and the other, *h′*, at about its center.

P is a cord or chain, the ends of which are attached to the slide I. This cord passes around a pulley, *i*, at the lower end of one of the ways H, and also around the loose pulleys F F′ on the mandrel C, and around a pulley, *j*, attached to the bed or platform A, as shown in Fig. 1.

The operation is as follows: The piece of cork E, previously cut off to the proper size, is adjusted between the spur-head *a* and the mandrel C and the spur-head *b* of the upright *c*, and the operator pushes the slide I forward in the direction of arrow 1, Fig. 2. By this movement of the slide the cork E is rotated through the medium of the cord or chain P and the pulleys F F′, said cord or chain and pulleys moving in the direction indicated by black arrows marked thereon in Fig. 2. During this movement the knife L roughs off the cork, and when the slide I nearly reaches the termination of this forward movement the pin *g*, at the lower or front end of the rack O, strikes the upright pin *h* on the way H, and causes said rack O to be moved so that the pinions N N will be rotated and the shafts J J and cap K lowered, and the knife L consequently depressed. This lowering of the shafts J J is effected in consequence of the pins *f f* fitting in the spiral grooves *e e*. The operator now draws the slide I backward or toward him, and the knife L finishes the cork the knife taking off a fine shaving. The red arrows in Fig. 2 indicate this movement of the cutter L, cord or chain P, and pulleys F F′, the pulley F′ turning the mandrel C during the latter movement. When the slide I nearly reaches the termination of its backward movement, the pin *g* of rack O strikes the pin *h′* of the way H, and the rack O is moved and the pinions N N turned so as to raise the shafts J J and cap K and elevate the knife L for a succeeding roughing-off cut. The inclination of the ways H H gives the taper form to the cork, and the taper may be varied as desired by regulating the position or inclination of said ways, and corks of cylindrical form may be cut by adjusting the ways in a horizontal position. Instead of this arrangement, however, the ways H H may have a permanent horizonal position, and the mandrel C be inclined, in order to give the taper form to the corks.

Thus it will be seen that two different cuts maybe given the corks, to wit., the roughing-off and the finishing cut—with one and the same knife, the cork having a continuous rotary motion in one direction imparted to it by the reciprocating movement of the knife.

The machine as a whole is extremely simple in its construction. It is operated with the greatest facility, and with a comparatively small expenditure of power.

I claim as new and desire to secure by Letters Patent—

1. Producing a cylindrical or conical cork by two cuts with one and the same knife by means substantially as herein described, or by any equivalent means.

2. The combination of the reciprocating cutter L and rotating mandrel C, when arranged substantially as shown, so that the latter will have a continuous rotary motion imparted to it in one and the same direction by the reciprocating movement of the cutter, for the purpose herein set forth.

3. The cap K of slide I, with the knife L and shafts J J attached, in combination with the sliding rack O, pinion N N, and pins *h h′*, arranged substantially as shown, for elevating and depressing the knife L, for the purpose specified.

PETER HOLMES.

Witnesses:
MICHAEL NORTON,
WILLIAM S. STEARNS.